United States Patent [19]
Ragland et al.

[11] Patent Number: 5,633,064
[45] Date of Patent: May 27, 1997

[54] HEAT BARRIER LAMINATE

[75] Inventors: G. William Ragland, Dunwoody, Ga.; Boyd A. Barnard; William M. Sheridan, both of St. Louis, Mo.

[73] Assignee: ATD Corporation, St. Louis, Mo.

[21] Appl. No.: 478,968

[22] Filed: Jun. 7, 1995

Related U.S. Application Data

[63] Continuation of Ser. No. 899,948, Jun. 17, 1992, which is a continuation of Ser. No. 395,399, Aug. 17, 1989, abandoned, which is a continuation-in-part of Ser. No. 360,835, May 30, 1989, abandoned.

[51] Int. Cl.$^6$ .................... B32B 3/02; B32B 7/02
[52] U.S. Cl. .................... 428/95; 428/215; 428/332; 428/340; 428/432; 428/457; 428/903; 428/920; 428/921; 442/378
[58] Field of Search .................... 428/285, 282, 428/284, 297, 298, 903, 920, 432, 457, 215, 332, 340, 921, 95

[56] References Cited

U.S. PATENT DOCUMENTS

| | | |
|---|---|---|
| 1,766,471 | 6/1930 | Van Dusen . |
| 1,801,666 | 4/1931 | Geer . |
| 2,226,589 | 12/1940 | Smyers . |
| 3,486,961 | 12/1969 | Adams . |
| 3,594,250 | 7/1971 | Tamm et al. . |
| 3,684,610 | 8/1972 | Frielingsdorf et al. . |
| 3,725,169 | 4/1973 | Allen et al. . |
| 3,934,066 | 1/1976 | Murch . |
| 3,993,828 | 11/1976 | McCorsley, III . |
| 4,013,815 | 3/1977 | Dorfman et al. . |
| 4,255,817 | 3/1981 | Heim . |
| 4,257,791 | 3/1981 | Wald . |
| 4,296,162 | 10/1981 | Jean . |
| 4,298,207 | 11/1981 | Hopper et al. . |
| 4,310,587 | 1/1982 | Beaupre ............ 428/246 |
| 4,312,909 | 1/1982 | Shaw . |
| 4,323,620 | 4/1982 | Iwabuchi et al. . |
| 4,346,140 | 8/1982 | Carlson et al. . |
| 4,350,727 | 9/1982 | Wald et al. . |
| 4,375,493 | 3/1983 | George et al. . |
| 4,395,453 | 7/1983 | Lines, Jr. et al. . |
| 4,395,455 | 7/1983 | Frankosky . |
| 4,401,707 | 8/1983 | Bailey et al. . |
| 4,428,999 | 1/1984 | George et al. . |
| 4,443,517 | 4/1984 | Shah . |
| 4,446,191 | 5/1984 | Miyadera et al. . |
| 4,454,189 | 6/1984 | Fukata . |
| 4,463,465 | 8/1984 | Parker et al. . |
| 4,485,138 | 11/1984 | Yamamoto et al. . |
| 4,499,134 | 2/1985 | Whitely et al. . |
| 4,500,589 | 2/1985 | Schijve et al. . |
| 4,504,991 | 3/1985 | Klancnik . |
| 4,522,876 | 6/1985 | Hiers . |
| 4,535,017 | 8/1985 | Kuckein et al. . |

(List continued on next page.)

FOREIGN PATENT DOCUMENTS

| | | |
|---|---|---|
| 0243827 | 11/1987 | European Pat. Off. . |
| 0272793 | 6/1988 | European Pat. Off. . |
| 2606159A | 3/1977 | Germany . |
| 0028856 | 3/1981 | Japan . |
| 1583744 | 2/1981 | United Kingdom . |

*Primary Examiner*—Terrel Morris
*Attorney, Agent, or Firm*—Burns, Doane, Swecker & Mathis, L.L.P.

[57] ABSTRACT

A lightweight and resilient heat barrier laminate which provides sound and vibration dampening. The laminate has a density less than about 5 lb/ft$^3$ and a total thickness of no greater than about 1 inch. The laminate includes a first metal foil having high heat conductivity and a first batt of insulating nonwoven fiber material having a thickness of at least about 0.03 inch. The first batt is an outermost layer of the laminate which is adhesively bonded to a first side of the first metal foil. The laminate also includes a second metal foil and a second batt of insulating nonwoven fiber material different from the material of the first batt. The second batt has a thickness of at least twice as thick as the first batt and is adhesively bonded to a second side of the first metal foil. The second metal foil is an outermost layer of the laminate, has high heat conductivity, is in contact with the second batt of insulating material and in contact with a carpet.

12 Claims, 1 Drawing Sheet

U.S. PATENT DOCUMENTS

| | | |
|---|---|---|
| 4,555,543 | 11/1985 | Effenberger et al. . |
| 4,557,969 | 12/1985 | Berbner et al. . |
| 4,559,862 | 12/1985 | Case et al. . |
| 4,569,870 | 2/1986 | Shinmi . |
| 4,597,818 | 7/1986 | Aoyama et al. . |
| 4,601,943 | 7/1986 | Haushofer et al. . |
| 4,609,433 | 9/1986 | Crutchfield et al. . |
| 4,612,239 | 9/1986 | Dimanshteyn . |
| 4,656,814 | 4/1987 | Lockington . |
| 4,678,702 | 7/1987 | Lancaster et al. . |
| 4,680,228 | 7/1987 | Sharma . |
| 4,687,697 | 8/1987 | Cambo et al. . |
| 4,695,509 | 9/1987 | Cordova et al. . |
| 4,698,258 | 10/1987 | Harkins, Jr. . |
| 4,705,161 | 11/1987 | Gozdiff . |
| 4,725,473 | 2/1988 | Van Gompel et al. . |
| 4,726,985 | 2/1988 | Fay et al. .................... 428/251 |
| 4,743,495 | 5/1988 | Lilani et al. . |
| 4,746,565 | 5/1988 | Bafford et al. . |
| 4,750,443 | 6/1988 | Blaustein et al. . |
| 4,767,687 | 8/1988 | Labonte . |
| 4,770,927 | 9/1988 | Effenberger et al. . |
| 4,770,937 | 9/1988 | Yagyu et al. . |
| 4,776,602 | 10/1988 | Gallo . |
| 4,777,086 | 10/1988 | Madden et al. . |
| 4,786,670 | 11/1988 | Tracy et al. . |
| 4,788,088 | 11/1988 | Kohl . |
| 4,808,465 | 2/1989 | Vane . |
| 4,812,145 | 3/1989 | Labonte . |
| 4,822,659 | 4/1989 | Anderson et al. . |
| 4,824,726 | 4/1989 | Closson, Jr. . |
| 4,833,018 | 5/1989 | Ruehl et al. . |
| 4,871,597 | 10/1989 | Hobson . |
| 4,898,783 | 2/1990 | McCullough, Jr. et al. . |
| 4,901,738 | 2/1990 | Brink et al. . |
| 4,915,998 | 4/1990 | Parenti, Jr. et al. . |
| 4,916,003 | 4/1990 | Le Sech et al. . |
| 4,996,095 | 2/1991 | Behdorf et al. . |

HEAT BARRIER LAMINATE

RELATED APPLICATIONS

This application is a continuation of application Ser. No. 07/899,948, filed Jun. 17, 1992; which is a continuation of application Ser. No. 07/395,399, filed Aug. 17, 1989, now abandoned, which is a continuation-in-part of application Ser. No. 07/360,835, filed May 30, 1989 (now abandoned).

FIELD OF THE INVENTION

This invention relates to laminates suitable for heat barrier and heat insulation uses.

BACKGROUND OF THE INVENTION

Various materials have been used as heat insulation and heat barrier layers in various applications. For example, fiber glass batts have been used for heat insulation, and nonwoven polyester fiber batts have likewise been used for spot heat insulation. However, the fiber glass materials are not desired in some manufacturing operations due to potential skin and eye irritation that may result from the use of fiberglass materials. Polyester materials are desirable materials but cannot withstand direct contact with high temperature elements present in some applications.

A desirable material for heat barrier and heat insulation is aramid materials, particularly in nonwoven fiber layers or mats. However, the aramid materials have been more expensive than desired to provide a cost-effective material for heat barrier layers in many commercial applications.

The object of this invention is to provide a cost effective heat barrier laminate.

A further object of the this invention is to provide a lightweight, effective heat barrier, especially for automotive uses and particularly for use as a heat barrier relative to automotive exhaust systems.

SUMMARY OF THE INVENTION

In one aspect, this invention is a laminate comprising a first metal foil layer; a first layer of insulating nonwoven fiber material adhesively bonded to the first side of the metal foil; a second layer of insulating nonwoven fiber material adhesively bonded to the second side of the metal foil; and a second metal foil layer in contact with said second layer of insulating material.

In another aspect, this invention is a laminate comprising a first metal foil layer; a layer of a flame retardant nonwoven fiber material adhesively bonded to the first side of the metal foil; a layer of insulating nonwoven fiber material adhesively bonded to the second side of the metal foil; and a second metal foil layer in contact with said second layer of insulating material, wherein the combination of the first metal foil and the layer of flame retardant material prevents damage to the layer of insulating material when the flame retardant side of the laminate is exposed to a 1200° F. flame applied at a 45° angle for ten seconds.

In another aspect, this invention is a method of forming a heat barrier laminate comprising (a) laminating between a first metal foil layer and a layer of heat insulating nonwoven fiber material a first film of thermoplastic adhesive; (b) laminating between the opposite side of the first metal foil and a layer of flame retardant nonwoven fiber material a second film of thermoplastic adhesive; and (c) laminating between the opposite side of the layer of insulating material and a second metal foil layer a third film of thermoplastic adhesive, whereby each film of thermoplastic adhesive is heated sufficiently to cause the adhesive to bond to the metal and fiber layers in contact with the adhesive film.

In another aspect, this invention is a method of forming a heat barrier laminate comprising (a) adhesively bonding together a first metal foil layer and a layer of flame retardant nonwoven fiber material and (b) adhesively bonding together the opposite side of the first metal foil and a layer of heat insulating nonwoven fiber material positioned between the first metal foil and a second metal foil layer.

In another aspect, this invention is a laminate comprising a first metal layer having a layer of nonwoven fiber material bonded to each side of the metal layer and a second metal layer bonded to the exposed surface of one of the layers of fiber material.

DESCRIPTION OF THE INVENTION

Figure 1:
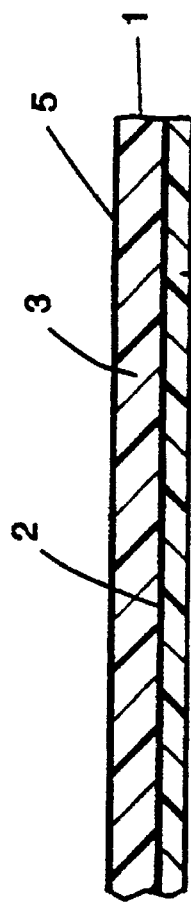
FIG. 1 is a cross section view of a laminate of this invention.

In its basic aspect, the laminates of this invention comprise a first metal layer between two insulating layers and a second metal layer on the outside surface of one of the insulating layers. In its preferred form the layer of insulating material on the opposite side from the second metal layer is a flame retardant material. Thus, the preferred laminates of this invention have one surface which is a layer of flame retardant fiber material and the other surface is a metal layer. Between these two surface layers are the other layer of metal and the other layer of insulating material.

It has been found that the combination of a thin layer of flame retardant material with a thin metallic layer, which has high heat conductivity, provides unusually effective high temperature protection for ordinary insulation material. This combination enables the use of such insulation materials in higher temperature applications than they can normally be used, especially in "spot" insulation applications.

An example of such spot insulation use is in the automotive area where it is desired to shield the floor of the passenger compartment of the automobile from the heat generated under the floor by the exhaust system, particularly from the muffler and/or catalytic converter, which may be positioned closer to the floor than the exhaust pipes in general. The flame retardant layer and metal layer combination in the laminates of this invention provide a surface for the laminate which is durable under exposure to the severe heat conditions and which is effective in protecting the insulating layer from degradation. The metal layer component in the laminate of this invention makes this laminate particularly effective in "spot" heat barrier applications, because the metal layer tends to conduct the heat from the hot spot area and dissipate the heat more uniformly over a larger surface area, thereby protecting the insulating layer and making the insulating layer more effective. This also makes the heat barrier laminates of this invention more effective for more applications.

It has been found particularly advantageous to have the metal surface layer of the laminates of this invention in combination with the metal layer which is embedded between the two insulation layers. The combination of the two metal layers provides superior heat shielding and heat dissipation, particularly suitable in automotive spot insulation applications. For example, in such use the laminate of this invention is positioned such that the flame retardant surface layer is placed on the metal floor of the passenger compartment and the metal surface layer is on top. The carpet pad or carpet of the passenger compartment is placed on the metal surface layer of the laminate of this invention. In this position, the laminate of this invention provides superior performance as a spot insulator for a given thickness and weight, compared to other types of insulation.

In this particular use, it has been found preferable to have the laminate of this invention to be from about 25% to about 75% of the total thickness of this laminate plus the floor carpet. More preferably this laminate will be from about 40% to about 60% of the total thickness and most preferably about 50%.

While the laminates of this invention are discussed and described herein as a "heat barrier" laminate, it is to be understood that the laminates of this invention also have surprisingly effective accoustical properties. Thus, the laminates of this invention can be designed for a desired temperature difference ($\Delta T$) and for a desired decibel difference ($\Delta db$) from one side of the laminate to the other. It is believed that the metal layer in the laminate of this invention provides unexpected sound and vibration damping, because it is adhesively bonded to the two nonwoven fiber mats. The metal layer prevents sound from traveling through the fiber mats, and the vibration energy imparted to the metal layer is dissipated in the mats to which it is bonded. As will be apparent, for pure accoustical uses, where heat is not a factor, it is not required to have a flame retardant layer; a which is not flame retardant nonwoven fiber mat is suitable.

In general, the laminates of this invention can be any desired overall thickness depending on the insulation ($\Delta T$) values desired and/or the sound insulation ($\Delta db$) values desired. Likewise, the relative thickness of the fiber mat on one side of the metal layer compared to the fiber mat on the other side of the metal layer will be variable according to the end properties desired in the laminate. Cost of the respective layers will frequently be a determining factor as well as physical properties.

The overall thickness of the laminate as well as the thicknesses, density, and other properties of each layer will be a matter of selection and choice by one skilled in the art following the disclosure herein and depending on the final properties desired for the laminate for a particular end use application. These factors will vary depending on whether the end use application is for heat barrier or sound barrier or both. For example, using a 1 mil aluminum foil with 0.1 in. aramid nonwoven fiber mat on one side and polyester nonwoven fiber mat on the other side, a 0.75 in. laminate may provide a $\Delta T$ of about 120° F. while a 0.375 in. laminate may provide a $\Delta T$ of about 100° F. between an automotive exhaust and the floor of the passenger compartment. It will also be recognized by those skilled in the art that the layers in the laminates of this invention may be multiple layers to provide desired properties following the disclosure herein.

In a preferred aspect, this invention provides thin, lightweight heat barrier laminates which are less than about 1 inch in thickness and less than about about 5 lb/ft$^3$ in weight. More preferably the laminate will be less than ¾ in. thick and more preferably less than ½ or ⅜ in. thick. Likewise, a more preferred weight will be in the range of about 3 to about 4 lb/ft$^3$, or less. The flame retardant layer is preferably about 0.1 in. or less in combination with the metal layer which is preferably about 0.005 in. or less in thickness. The insulating layer will constitute the balance of the total laminate thickness. More preferably, the flame retardant layer is less than about 0.08 in. and most preferably in the range of about 0.03 to about 0.06 in. The metal layer is preferably a metal foil, which provides flexibility for manufacturing and for end use applications, having a thickness less than about 0.003 in., more preferably less than about 0.002 in. and most preferably for many end use applications has a thickness in the range of about 0.001 in. to about 0.0015 in.

Materials which are preferred for the laminates of this invention include aluminum foil for the metal layer and aramid nonwoven fiber batt for the flame retardant layer. The insulating layer is preferably a polyester or fiber glass nonwoven batt. The layers of the laminate may be bonded or adhered together in any manner desired for any particular end use application of the laminate. It is preferred to avoid puncturing or tearing the metal foil thus retaining the integrity of the lateral heat conductivity of the metal layer.

While the outside surface metal layer is preferably adhesively bonded to the insulating material layer, it is not necessary that the surface metal layer be adhesively bonded thereto. This metal layer merely needs to be in thermal contact with the insulating material layer and may be held in place by any desired means. In one configuration, this metal layer can actually be attached to the bottom of the floor carpet of an automotive passenger compartment and is thereby placed in contact with the insulating layer to form the laminate of this invention when the carpet is installed on top of the insulating layer which has the other metal layer and the fire retardant material layer on the other side thereof.

The layers of the laminate are preferably bonded with an adhesive which is appropriate for the temperature ranges in which the laminate is to be used. The adhesive may be applied as a liquid or solid, which may be sprayed as a liquid or powder on the surface of the fiber batts and/or the metal foil to bond the fiber materials to the metal foil. However, a preferred adhesive is a thermoplastic adhesive supplied in the form of a sheet or film, typically about 0.0015 in. in thickness, for example the thermoplastic adhesive film available from DuPont under the designation or trademark "Surlyn". The advantages of using the adhesive in the form of a film will be readily apparent to one skilled in the art of manufacturing laminates. The adhesive film can be fed from a roll and positioned between the metal foil and the fiber batt, then heated and pressed at the appropriate temperature and pressure to melt or flow the adhesive to bond the fiber batt to the metal foil. This film or sheet form of adhesive provides the process advantages of being easy to use, providing a uniform layer of adhesive and having no solvents or airborne particles present during the laminating processes.

Referring now to the drawings illustrating specific embodiments of the present invention, FIG. 1 is a cross sectional view of a typical laminate of the present invention. Laminate 1 comprises metal layer 2 having adhesively bonded to one side of the metal layer an insulating layer 3. To the other side of metal layer 2 is adhesively bonded flame retardant layer 4. Second metal layer 5, in this embodiment, is bonded to insulation layer 3.

As indicated above, the method of attaching the insulating layer and/or the flame retardant layer to the metal layer can be done by any desirable means, but the most economical and convenient means is by adhesive means which may be liquids or solids and may be thermoplastic or thermoset adhesives, as well as catalytically cured adhesive systems including air or moisture cure adhesive systems. The relative thicknesses of the three layers comprising the laminate of the present invention, are discussed above and can be adjusted by one skilled in the art to meet the desired performance requirements of any particular end use application for which the heat barrier laminate of the present invention is intended to be used.

Figure 2:
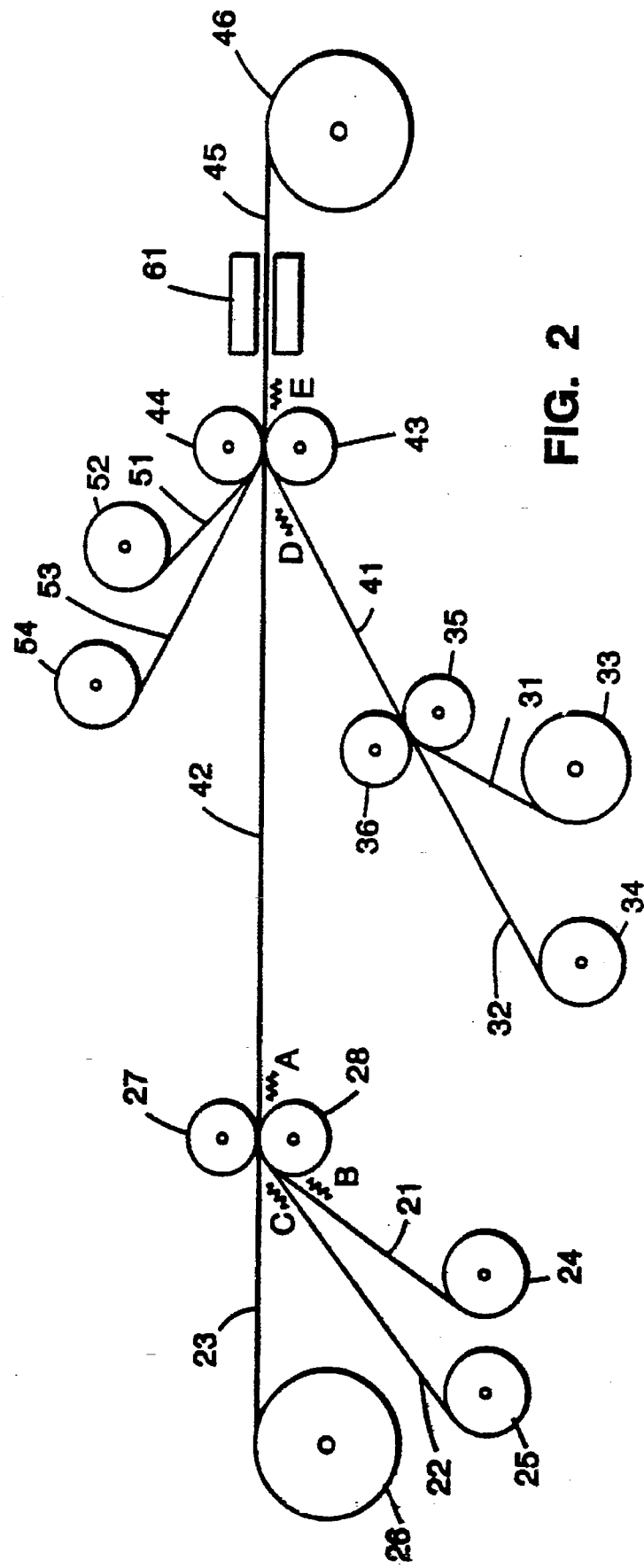
FIG. 2 is a schematic of a process for making laminates of this invention.

FIG. 2 illustrates one embodiment of a manufacturing method for forming the laminate of the present invention. Other embodiments and variations thereof within the scope or teaching of this invention will be apparent to one skilled in the art. In the particular embodiment illustrated in FIG. 2, aluminum foil 21 is fed from roll 24 along with adhesive film 22 from roll 25 and a polyester or fiberglass nonwoven mat 23 from roll 26 are all fed to laminating rolls 27 and 28 which press and laminate the three layers such that the adhesive 22 bonds the fiber mat 23 to aluminum foil layer 21 to form an aluminum foil-adhesive-insulating fiber mat laminate 42. Heat can be applied by laminating rolls 27 and/or 28 or heat can be applied in areas B and/or C in order to provide the required heat and temperature level to cause adhesive 22 to effectively melt or flow sufficiently to bond aluminum layer 21 to fiber mat layer 23. Alternatively, heat may be applied in area A to effect or assist in the bonding of the adhesive between the metal and fiber layers.

The aluminum foil-adhesive-insulating fiber mat laminate 42 is then fed to laminating rollers 43 and 44 along with a heat retardant fiber mat layer, which in this embodiment has a layer of adhesive already laminated to the surface of the flame retardant fiber mat which will contact the aluminum layer 21 of previously formed laminate 42. The adhesive layer between the aluminum foil layer and the flame retardant fiber mat may be supplied separately as adhesive 22 is supplied in the first step.

However, in some instances it may be preferred, as shown in FIG. 2, to form a laminate 41 which is a combination of flame retardant fiber mat 31 such as aramid fibers, fed from roll 33 along with adhesive film 32, such as the "Surlyn" thermoplastic adhesive available from Dupont, fed from roll 34. Fiber mat 31 and adhesive 32 are heated and laminated together in laminator rolls 35 and 36 to form the laminate 41. Laminate 41 is in turn fed along with laminate 42 to laminating rolls 43 and 44 with heat applied in areas D and/or E to bond the fiber mat 31 to aluminum layer 21. A second aluminum foil layer 51 is fed from roll 52 along with adhesive 53 from roll 54 to rollers 43 and 44 to be contacted with laminate 42, thus producing final laminate 45 of this invention, which is rolled on roll 46. The bonding of the second aluminum layer 51 to the insulation layer 23 of laminate 42 can be done with heated roller 44, or by heat applied to the top areas similar to the way areas D or E are heated, and/or heat can be applied by oven 61o In some applications, the oven 61 alone may be desirable so that rollers 44 and 43 do not compact or distort the laminate structure before adhesives 53 and/or 32 are set.

The final laminate of the present invention can then be cut, slit or diecut to form the various shapes desired for heat and/or sound barrier and/or insulating layers for particular end use applications. The speed of lamination and the temperatures used in the laminating process will depend on the particular materials and particularly the adhesive material used.

As an alternative to the embodiment shown in FIG. 2, the adhesive may be a liquid adhesive which is sprayed between layers to effect the desired bonds between the respective fiber layers and the aluminum foil layer. Also the adhesives can be in other forms, such as powders, and can be combinations of film, liquid, etc.

The laminates of this invention are particularly useful for products which meet the Federal Automotive Standard 302 for flame retardant requirements for automotive insulation. The flame retardant layer of nonwoven fiber mat useful in this invention can be flame retardant fibers or can be other fibers treated with a flame retardant material.

Having described the present invention in the above descriptions and illustrated the present invention in the embodiments illustrated in the attached drawings, variations of the present invention will be apparent to one skilled in the art following the teachings contained herein. The scope of the present invention is reflected by the following claims.

What is claimed is:

1. A lightweight and resilient heat barrier and sound and vibration damping laminate having a density less than about 5 lb/ft$^3$ and a total thickness of no greater than about 1 inch, the laminate comprising a first metal foil having high heat conductivity; a first batt of insulating nonwoven fiber material having a thickness of at least about 0.03 inch and comprising an outermost layer of the laminate adhesively bonded to a first side of the first metal foil; a second batt of insulating nonwoven fiber material different from the material of the first batt and having a thickness of at least twice as thick as the first batt and adhesively bonded to a second side of the first metal foil; and a second metal foil comprising an outermost layer of the laminate and having high heat conductivity in contact with said second batt of insulating material, and the second metal foil being in contact with a carpet.

2. The laminate according to claim 1, wherein the thickness of the first batt is no greater than about 0.1 inch.

3. The laminate according to claim 1, wherein the first batt comprises a flame retardant material.

4. The laminate according to claim 1, wherein the second batt comprises a polyester or fiberglass batt.

5. The laminate according to claim 1, wherein the second metal foil is adhesively bonded to the first batt.

6. The laminate according to claim 1, wherein the first and second metal foils are aluminum foils.

7. The laminate according to claim 1, wherein the first batt is in contact with a floor of a passenger vehicle.

8. The laminate according to claim 1, wherein the laminate has a thickness of 25% to 75% of a total thickness of the laminate and carpet.

9. The laminate according to claim 1, wherein the laminate has a thickness of 40% to 60% of a total thickness of the laminate and carpet.

10. The laminate according to claim 1, wherein the carpet comprises a floor carpet of an automobile.

11. The laminate according to claim 10, wherein the second metal foil is attached to a bottom surface of the floor carpet.

12. The laminate according to claim 10, wherein the floor carpet is adhesively bonded to the second metal foil.

* * * * *